UNITED STATES PATENT OFFICE 2,574,179

METHOD OF PRODUCING A STABILIZING INGREDIENT FOR FOOD PRODUCTS

Chastain G. Harrel and Robert O. Brown, Minneapolis, Minn., assignors to Pillsbury Mills, Inc., Minneapolis, Minn., a corporation of Delaware No Drawing. Application August 27, 1945,
Serial No. 613,038

2 Claims. (Cl. 99—150)

This invention relates to edible stabilizers for use in semi-solid and semi-liquid foods to form and maintain colloidal suspensions and to prevent shrinkage, settling and seepage of liquid ingredients from the completed food product.

Our invention has particular relationship to a stabilizer produced from farinaceous ingredients and to the method of producing the same.

Stabilizing ingredients have been quite widely utilized in the making of ice cream, salad dressing and other food products and for the most part, have consisted in gelatin-like or colloid-forming materials obtained from plant proteins such as Irish moss, animal gelatin, agar agar, fruit pectins and the like. Such stabilizers have increased to some extent, the bulk of the manufactured food product and have been instrumental in forming the product into a colloidal suspension to maintain physical form and prevent settling or shrinkage of the product. They have, however, been objectionable from the standpoint of changing the taste of the product, imparting usually, a gelatin or plant taste to the essential food ingredients and furthermore, in most instances, such stabilizers used in relatively small quantities were not sufficient for performing the desired functions over a sufficiently long period of time.

It is an object of our present invention to provide a comparatively inexpensive stabilizer or colloid-forming composition produced essentially from farinaceous starches and having very wide and varied use in the stabilization of cooked and uncooked food products.

A further object is the provision of a comparatively simple, commercially successful method for preparing an edible food stabilizer of the class described.

In carrying out our improved method, the basic food product utilized comprises cereal starch such as wheat starch, corn starch or flour, preferably in comminuted form. An aqueous starch suspension is first produced by mixing a relatively large percentage of water with the starch utilized. To the mixture or starch suspension, we add a small amount of a starch liquefying enzyme of the amylase type, the proportion of said enzyme to the weight of the total mixture, being preferably less than .15%. The said ingredients are mixed at room temperature and are thereafter carefully heated during agitation under a temperature control to prevent heating beyond a critical range of from 62° to 72° C. After the mixture has been heated to a temperature within said critical range the starches should be thoroughly liquefied and thereafter under such temperature control, the mixture is further heated at approximately 72° C., average atmospheric pressure for 15 minutes to assure complete gelatinization and liquefication of the starch or starches. It is very essential that within said critical temperature range, the temperature of said mixture be maintained at a point to prevent thickening of the starch suspension.

After complete liquefication and gelatinization of the starch and starches, the mixture is cooled to approximately 55° C., and then a small percentage of a saccharifying enzyme of the amylase type is added to the mixture, preferably in about the same proportion as the proportion of starch liquefying enzyme originally utilized. The mixture is then maintained at said favorable temperature around 55° C. to cause digestion of the starches for a period of from one to three hours.

Thereafter, the mixture is boiled for a relatively short period to kill all enzymes present. Boiling may be successfully carried out for this purpose during a time range between 20 and 40 minutes. Thereafter, with the temperature of the mixture at approximately the boiling point, a relatively small quantity, say from 5% to 35% by weight of the comminuted, farinaceous starch materials, are added to the batch and thoroughly admixed therewith.

Thereafter, the mixture preferably still hot, is spray-dried or roll dried to produce a white powder.

The new product as obtained through the carrying out of our method as described, comprises in comminuted form, a large variety of sugars varying from the simple sugars up to dextrines. It contains poly-saccharides, mono-saccharides, as well as a variety of different gelatinized starch compositions.

Mixed with foods prior to cooking, freezing or preparation for use, it has demonstrated wholly unexpected and highly advantageous results in the stabilization for indefinite periods of a great variety of foods and food products. In use as a stabilizer for ice cream, for pie fillings, whipped cream, meringues, cake frostings, egg omelets, egg soufflés, it surpasses as a stabilizer, any commercial or experimental stabilizers known to us or to the research laboratory of our assignee, Pillsbury Mills, Inc.

The texture of food products prepared with our stabilizer material, is smooth, uniform in texture and will hold its colloidal suspension attained by the use of our ingredient, for very long periods of time. The bulk of the product is increased by the use of our stabilizer within reasonable limits. The foods prepared will not settle or liquefy or perceptibly change physical state at storage temperature, when standing from a week to ten days. The product is a blend of a wide variety of sugars with a variety of gelatinized starches so intimately blended in the minute particles that the colloidal action of these starches seems a collective or combinative action.

The stabilizer blends and distributes spices, condiments and flavoring throughout the entire product and also, because of the many sugars contained, provides an adjustment for sugar in the case of many products.

In developing our improved method and our new product, experiments were conducted with various gelatinized starches and we incontrovertibly proved that gelatinized starches will not remotely approximate the results attained through the use of our improved product.

We will now recite an example of proportions, temperature and time periods which may be very successfully utilized to produce the desired results although it is to be understood that we are not restricted to such inasmuch as successful results may be obtained with considerable variance in the proportions and temperature and time periods selected.

Example

To one hundred pounds of farinaceous starch (wheat or corn starch, or flour are suitable), preferably in comminuted solid form, are added three hundred twenty pounds of water and one half pound of starch liquefying enzymes of the amylase type. The ingredients are mixed together and agitated at room temperature and thereafter, during agitation and with temperature control, the mixture is heated up to the critical range for liquefication and gelatinization of the starch. The critical range, we find to be between 62° and 72° C. After the mixture attains a temperature within said critical range, the starch or starches should be thoroughly liquefied and thereafter, temperature is controlled to prevent the mixture from getting too thick to efficiently handle. The temperature is held at from 72° to 77° C. for a period of approximately fifteen minutes after attaining a temperature of from 72° to 77° C. to assure that complete gelatinization and liquefication of all starches, takes place.

Thereafter, the mixture or starch suspension is cooled to approximately 55° C. and approximately one half pound of a saccharifying enzyme of the amylase type is added and thoroughly admixed therewith. The mass is then permitted to digest for from two to three hours with the temperature maintained during such time, at 55° C. Thereafter, the aqueous mixture or suspension is boiled a sufficient period to destroy all remaining enzymes present. A period of from twenty to forty minutes is adequate. At the boiling point a quantity of said comminuted starches, say from twenty five to thirty-five pounds, is added to the mass and thoroughly admixed therewith, while the temperature is at the boiling point and thereafter, the mass is spray-dried, preferably while still hot.

A few examples of use

In ice cream and sherbets, our improved stabilizer has demonstrated unusual and unexpected results. For example, using an ice cream base powder containing requisite milk in a proportion of from 6% to 8%, water 57½%, corn syrup 30% and our improved stabilizer 5%, a delicious ice cream, characterized by a smooth, heavy texture and having a delicious sweet taste, is produced This ice cream product in our tests for stabilization, has materially exceeded in results, any of the ice cream stabilizers available to use on the market at the present time. The texture is smoother and the product will not settle or liquefy nearly as soon as products made with stabilizers now available on the United States market. Furthermore, with the use of our stabilizer, the objectionable vegetable, gelatin and plant tastes are entirely absent in the ice cream product.

With our improved stabilizer, ordinary cream such as that sold for cereal and coffee use may be whipped with 3% to 4% of our stabilizer to produce a whipped delicacy which will be held in suspension and retain its physical form for long periods. Here again, the addition of our stabilizing material adds no foreign or unpleasant taste to the whipped cream but slightly sweetens the same. The relatively small amount of gelatinized starch is so dispersed and intimately blended with the many sugars of our products that no starch taste is noticeable in the finished product.

Likewise, our stabilizer has shown a high degree of success in stabilizing salad dressing wherein from 3% to 5% by weight is recommended. Salad dressing is held in a state of suspension and will not settle. For mayonnaise type dressing, containing 50% of oil ingredients, we recommend the use of from 3% to 15% of our stabilizer depending upon the degree of solidity desired.

The new product has demonstrated remarkable stabilizing capacity in preparing omelets and various soufflés. In making an egg omelet if from 3% to 8% of our stabilizer is used, the omelet produced will be of somewhat greater bulk than that produced from the same volume of ingredients without the use of our stabilizer. The omelet will retain its size and physical shape without falling or settling at room temperature, for several hours. It may be placed in an ice box or refrigerator at the usual temperature and allowed to stand for longer than ten days and then heated and served without losing, apparently, any of its fluffiness and physical characteristics.

The same advantages are obtained through the use of our improved stabilizer in cream type pie filling, meringues and puddings. Another important use and quality of our stabilizing ingredient is in connection with the preparation of ices, ice cream, cake frostings, strained honey and other food products containing a relatively large amount of sugar where under present conditions, crystallization of the sugar takes place after the product stands. With the use of our material, the food product stays smooth, retaining its desired texture and will not crystallize at ordinary climatic temperatures for indefinite periods.

What is claimed is:

1. The method of producing a stabilizing ingredient for foods and food products which consists in preparing an aqueous starch suspension from farinaceous starch and water, adding a relatively small amount of starch liquefying enzyme, heating said suspension at favorable temperature for a period of time, to assure the complete gelatinization and liquefication of the starches, then cooling the resultant mass to a temperature favorable to enzymatic saccharification of the starches, adding a relatively small proportion of a saccharifying enzyme and maintaining the temperature of the mass at approximately said favorable point for a period of from one to three hours, thereafter boiling the mass for a period of time sufficient to kill all enzymes then present and thereafter, admixing with the mass at substantially boiling temperature, a relatively small percentage of comminuted, farinaceous starch material and then drying the mass to produce a quantity of comminuted, dry stabilizer.

2. The method of producing a stabilizing ingredient for foods and food products which consists in preparing a thin, aqueous starch suspension from farinaceous starches and water, completely gelatinizing and liquefying starches in said suspension with the aid of a starch liquefying enzyme, cooling the resultant mass to a temperature in the neighborhood of 55° C., admixing with said mass a small proportion of saccharifying enzyme and maintaining the temperature of said mixture in the neighborhood of 55° C. for a period of from one to three hours, thereafter destroying all enzymes present in the mass and intimately admixing with the mass, at substantially boiling temperature, a quantity of farinaceous starch material in a proportion by weight of from 2% to 10% of the weight of said mixture and then drying the mixture.

CHASTAIN G. HARREL.
ROBERT O. BROWN.

REFERENCES CITED

The following references are of record in the file of this patent:

UNITED STATES PATENTS

| Number | Name | Date |
|---|---|---|
| 2,163,782 | Fetzer | June 27, 1939 |
| 2,192,952 | Wolff | Mar. 12, 1940 |
| 2,210,856 | Hellwig et al. | Aug. 6, 1940 |
| 2,221,373 | Farley | Nov. 12, 1940 |
| 2,266,051 | Lebeson | Dec. 16, 1941 |
| 2,406,585 | Buchanan et al. | Aug. 27, 1946 |

OTHER REFERENCES

The Ice Cream Trade Journal, page 36, December 1936.

The Ice Cream Review, pages 29, 45, 46, December 1940.